UNITED STATES PATENT OFFICE.

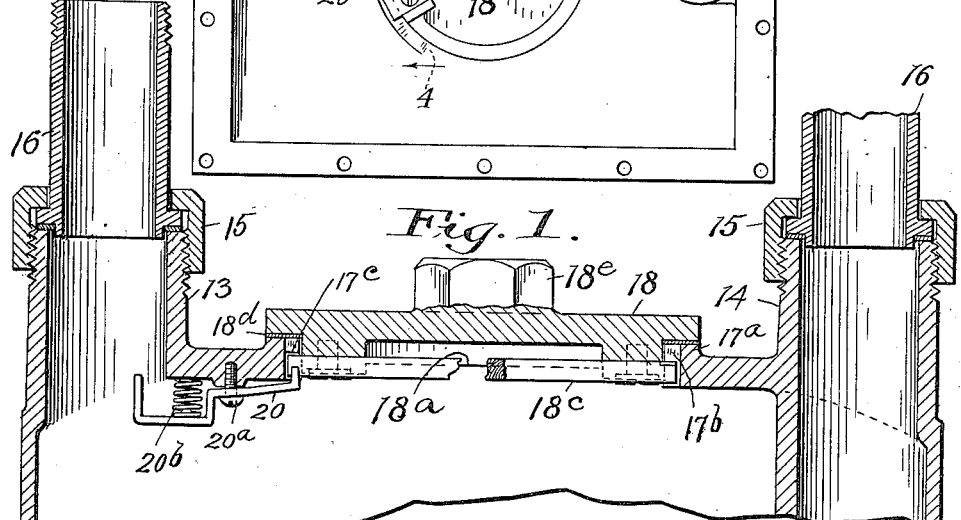

WILLIAM H. KNIGHT, OF CLEVELAND, OHIO.

GAS-METER.

1,090,864. Specification of Letters Patent. Patented Mar. 24, 1914.

Application filed November 3, 1911. Serial No. 658,340.

*To all whom it may concern:*

Be it known that I, WILLIAM H. KNIGHT, a citizen of the United States, residing at Cleveland, in the county of Cuyahoga and State of Ohio, have invented a certain new and useful Improvement in Gas-Meters, of which the following is a full, clear, and exact description.

This invention relates to gas meters and especially to a removable meter cover which is designed to normally close and seal an aperture in the top of the meter casing, and to a proving glass which replaces and is employed instead of the cover during the testing and proving of the meter.

One of the objects of the invention is to provide a cover which can be quickly and easily put into position and by a simple movement tightened so as to render the joint gas tight, and which can be easily removed by an authorized person, or one familiar with the construction.

Further, the invention aims to provide an automatically acting concealed lock which effectively locks the cover against removal as long as the meter is in use.

Still further, the invention aims to provide a simple and effective form of proving glass which is designed to replace the meter cover during the proving of the meter, and which can be placed in operative position or removed easily and quickly.

The invention may be briefly summarized as consisting in certain novel details of construction and combinations and arrangements of parts which shall be described in the specification and set forth in the appended claims.

Figure 5:
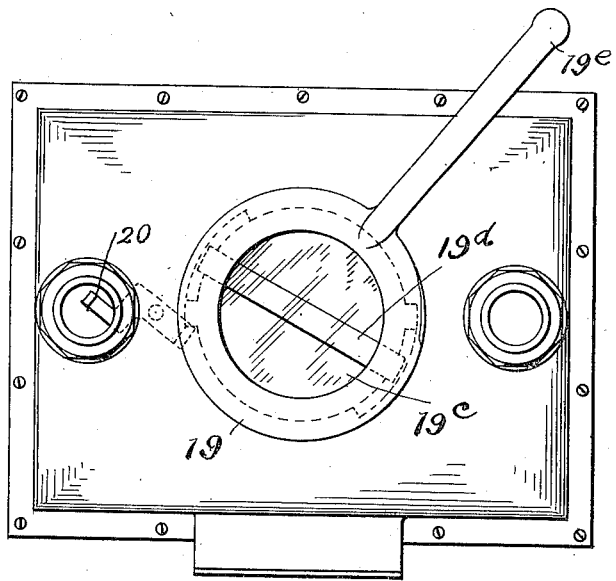
Figure 6:
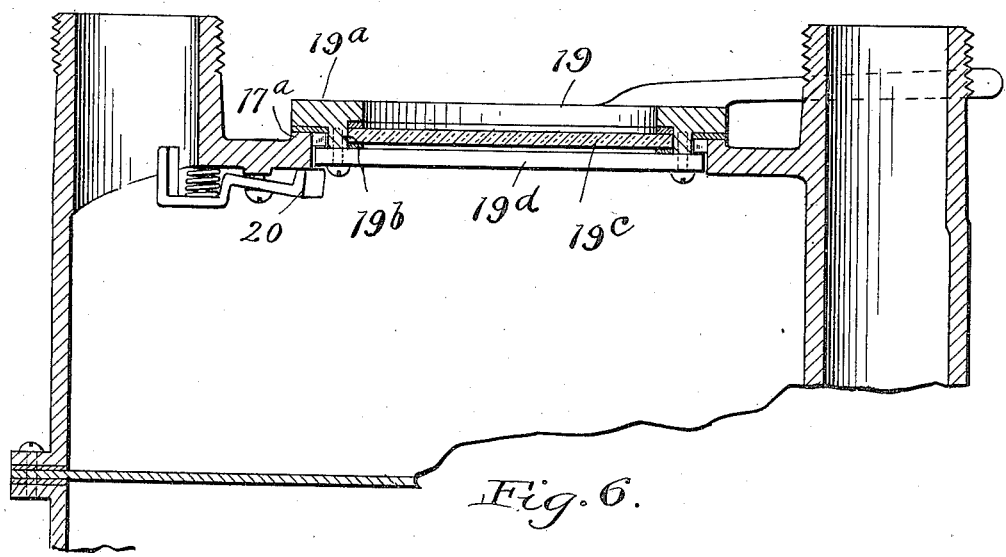

In the accompanying sheets of drawings, Figure 1 is a vertical sectional view through a portion of the meter equipped with my invention, the inner operating parts of the meter being omitted; Fig. 2 is an interior view on a slightly reduced scale, of the upper part of the meter casing, showing the cover in place and also showing by dotted lines the cover lock in inoperative position; Fig. 3 is a perspective view looking toward the interior of the same part of the meter casing and showing particularly the aperture in the casing, and those parts which are utilized in the attachment and locking of the cover; Fig. 4 is a detail sectional view substantially along the curved line 4—4 of Fig. 2; Fig. 5 is a top plan view of the meter with the proving glass in position; Fig. 6 is a slightly enlarged sectional view of the same.

Referring now to the drawings, wherein I have shown the preferred form of my invention, 10 designates the meter casing which is in this case formed of cast iron and includes a main or gas measuring portion 11 which is designed to receive the diaphragms and other parts of the measuring mechanism, and an upper or gas receiving portion 12, which incloses the valve mechanism and registering mechanism. The operating mechanism of the meter is not here shown for the reason that it forms no part of the present invention, the latter involving particularly the casing and certain attachments, including the cover and proving glass, as before stated.

The upper or gas receiving portion 12 of the casing is provided at the top with two tubular projections 13 and 14, adapted respectively for admitting the gas to the meter and for exhausting or carrying away the gas after it has been measured. To these projections 13 and 14 are secured by coupling nuts 15, inlet and outlet pipes 16. At the top of the gas receiving portion 12 of the casing and located centrally thereof or midway between the tubular projections 13 and 14 is an aperture 17, which is designed to be normally closed and sealed by a cover 18 shown in Figs. 1 and 2, and to be temporarily closed and sealed by a proving glass 19 shown in Figs. 5 and 6. Surrounding said aperture is an upwardly extending flange $17^a$ which forms a seat for a gasket to be referred to presently, and for the cover or proving glass. At diametrically opposite points of the aperture wall and flange $17^a$ are a pair of notches $17^b$ adapted to receive locking projections on the cover and proving glass, and on the inner side of the meter top or top member 12 of the casing are a pair of grooves which extend circumferentially short distances in opposite directions from these notches $17^b$, leaving a pair of clamping ridges or tongues $17^c$, each having a beveled under surface, as shown most clearly in Fig. 3.

The cover 18 is provided with a rim portion which overhangs and is seated upon the flange $17^a$ and the underside of the cover is provided with an inwardly extending flange $18^a$ which extends within and fits rather closely the aperture 17. At diametrically opposite points of the flange are enlargements or lugs 18ᵇ and secured in notches of these lugs is a locking cross bar 18ᶜ which, as shown, extends centrally across the lower side of the cover and has its ends projecting outwardly beyond the flange 18ᵃ. The ends of this cross bar are of a size such that they easily fit within the oppositely disposed notches 17ᵇ of the aperture, and on their lower sides are beveled in conformity with the bevel of the ridges 17ᶜ so that they may ride up on the latter. Therefore, to place the cover in place, and to tighten it, all that it is necessary to do, is to insert the cover in the aperture so that the lugs enter the notches and then turn the cover through a short arc so that the projecting ends of the bar 18ᶜ ride up on the inclined ridges 17ᶜ, thereby causing the cover to be drawn tightly on the flange seat 17ᵃ. By the use of a suitable gasket 18ᵈ, the aperture is sealed or rendered gas tight, by so turning the cover. In order that the cover may be turned through the necessary arc to seal the aperture or in the reverse direction to loosen the cover for its removal, the cover is provided at the top with a lug or boss 18ᵉ which is hexagonal or otherwise shaped to accommodate a wrench.

It will be seen from the above that the cover can be easily applied and tightened to close and seal the aperture, but to render a cover of this type effective for practical purposes, means should be provided for preventing its removal by an unauthorized person who might be desirous of tampering with the meter to stop or alter the registering mechanism.

I prevent the removal of the cover by one not authorized to remove it, by means of a lock which acts automatically when the cover is turned in the manner above stated, and which is concealed from view and so located that its existence cannot be discovered by one unfamiliar with the construction of the meter, and even if its existence is known, access cannot be had to it as long as the meter is in use or connected for use. This lock consists of a member 20 which is held by a screw 20ᵃ, to the underside of the top of the meter casing, as shown most clearly in Fig. 1, the forward end of the locking member 20 normally projecting up into the adjacent notch 17ᵇ of the aperture and being held in that position by a spring 20ᵇ, which is arranged between the cover and the rearwardly projecting end of the locking member.

When the cover is placed in the aperture preparatory to turning it to secure the tightening action, the end of the cross bar 18ᶜ presses the end of the locking member 20 downwardly, but after the cover has been turned, the inner or forward end of the locking member 20 snaps back into place so as to prevent the ends of the cross bar being brought opposite or in alinement with the notches 17ᵇ. The outer or rear end of the lock 20 is located directly beneath the inlet tubular member 13, as shown clearly in the drawings. This arrangement therefore permits the withdrawal of the lock 20 from the path of the bar 18ᶜ, by inserting the hand or a suitable tool down into the tubular projection 13, but it can not be withdrawn until after the inlet pipe 16 is disconnected from the tubular projection. Inasmuch, however, as the coupling nuts 15 are in this type of meter sealed when the meter is installed, access cannot be had to the lock 20 by the user of the meter or other person intent on injuring or destroying the accuracy or effectiveness of the meter, except by breaking the seal and disconnecting the meter. Consequently, the meter reader or other person inspecting the meter would subsequently discover that the meter had been tampered with. However, the user would ordinarily not be familiar with the construction of the meter or know the location of the lock, and would therefore be unable to remove the cover.

The above construction of cover and the parts of the meter top directly associated therewith, permits the use of an effective form of proving glass which can be manipulated, that is, put into place and removed very quickly and easily. This proving glass is shown in Figs. 5 and 6, and it includes an annular or ring-like member 19ᵃ having a rim which overhangs the upwardly extending flange 17ᵃ of the meter top, as in the case of the cover 18. The ring also has a downwardly projecting annular flange 19ᵇ which is designed to fit into the aperture 17 and also to receive a circular glass or transparent plate 19ᶜ. Extending across the proving glass beneath the circular transparent plate 19ᶜ and secured to the flange 19ᵇ is a cross bar 19ᵈ. It has a double function of holding the glass 19ᶜ in position and also of coöperating with the notches and locking ridges to clamp the sealing glass into the aperture and render it gas tight, this part having its ends projecting beyond the flange 19ᵇ, as is the case with the cover plate, so that the ends may be inserted in the notches of the meter top and may ride up on the beveled surfaces of the ridges 17ᶜ, when the proving glass is turned. In other words, this proving glass is inserted and clamped into position in precisely the same manner as is the cover 18. It will be understood that this proving glass will be used only when the meter is being proven or tested, the glass plate 19ᶜ being provided in order that the operating mechanism beneath the proving glass can be observed while the meter is in action. Inasmuch as in testing or adjusting a meter, it is often necessary that the cover plate be removed numerous times, it will be desirable to avoid having the proving glass locked in position when it is tightened in the aperture. Furthermore, during the use of the proving glass, there is no occasion for locking it in position, it being only essential that the aperture be sealed by turning the proving glass, inasmuch as the proving is usually done in the factory of the manufacturer or at some other locality, where the proving is done by the proper person. I therefore arrange the locking member 20 so that it can be readily thrown out of action when desired. This is accomplished by simply turning the member 20, about the screw $20^a$ as an axis, to one side, or to a position as shown by dotted lines in Fig. 2, such that the inner end which normally serves as a locking portion is out of and to one side of the corresponding notch $17^b$. This can be very readily done when the meter is disconnected, by inserting the finger or suitable tool into the tubular member 13 and by withdrawing the inner end of the locking member from the notch and then turning the locking member. The rim of the proving glass is preferably provided with a laterally projecting handle $19^e$ by means of which the proving glass can be tightened or released. Thus, because of this construction, the proving of the meter is a very simple matter, for the reason that the glass can be inserted in the aperture and tightened so as to seal the joint or be removed very quickly, and there is no occasion for soldering or removing previously soldered members, nor must the proving glass be tediously screwed into position or unscrewed to permit its removal, as has been necessary with the prior constructions.

Having thus described my invention, what I claim is:

1. A gas meter comprising a casing having a gas receiving compartment provided with gas inlet and outlet openings and having an aperture, a cover adapted to close and seal the aperture, and an automatic concealed lock located wholly within the casing and having a portion which is adapted to engage a portion of the cover to prevent removal of the latter.

2. In a gas meter, a casing having a gas receiving compartment provided with gas inlet and outlet openings and having an aperture, a cover adapted to close and seal the aperture when inserted and turned in one direction, and an automatic concealed lock located within the casing and having means which is automatically actuated when the cover is turned to tighten the same for preventing complete turning in the reverse direction to withdraw the cover.

3. In a gas meter, a casing having gas inlet and outlet openings and an aperture, a cover adapted to close and seal the aperture, and a lock located within the casing and arranged to normally prevent the withdrawal of the cover, said lock being accessible from one of said openings to withdraw it from operative position.

4. A gas meter comprising a casing having an aperture, a cover, the casing and cover having respectively grooves and projections adapted to interlock to clamp the cover in place when the latter is turned, a proving glass adapted to be inserted in and to seal the aperture, and a lock located on the interior of the casing and serving when in normal position to prevent the removal of the cover and arranged to be shifted to inoperative position during the use of the proving glass.

5. A gas meter comprising a casing having an aperture, a cover adapted to normally close and seal the aperture, a proving glass adapted to seal the aperture when the cover is removed, and a lock located on the interior of the casing and serving when in normal position to prevent the removal of the cover, said lock being pivoted, whereby it may be shifted to inoperative position during the use of the proving glass.

6. In a gas meter, a casing having an aperture, a proving glass adapted to close and seal the aperture, said proving glass comprising a ring having a flange extending into the aperture, a transparent plate carried by said ring and seated within the flange, and means secured to the bottom of said flange and having a portion extending inwardly therefrom, and serving to hold the transparent plate to the ring, a portion extending outwardly from the flange and serving as a locking projection, and means on the casing with which said locking projection coöperates to hold the proving glass in position.

In testimony whereof, I hereunto affix my signature in the presence of two witnesses.

WILLIAM H. KNIGHT.

Witnesses:
 H. R. SULLIVAN,
 A. F. KWIS.

Copies of this patent may be obtained for five cents each, by addressing the "Commissioner of Patents, Washington, D. C."